United States Patent [19]

Stokes

[11] Patent Number: 5,524,456
[45] Date of Patent: Jun. 11, 1996

[54] PRESSURE TANK RECYCLE SYSTEM

[75] Inventor: Charles A. Stokes, Naples, Fla.

[73] Assignee: Public Service Marine Inc., Houston, Tex.

[21] Appl. No.: 546,405

[22] Filed: Oct. 20, 1995

[51] Int. Cl.[6] ............................................. F25J 3/00
[52] U.S. Cl. .................................... 62/619; 62/48.2
[58] Field of Search ................................ 62/11, 48.2

[56] References Cited

U.S. PATENT DOCUMENTS

| | | | |
|---|---|---|---|
| 3,663,644 | 5/1972 | Harvey | 62/11 |
| 4,110,091 | 8/1978 | Daeschler et al. | 62/48.2 |
| 5,050,603 | 9/1991 | Stokes et al. | 123/523 |
| 5,176,002 | 1/1993 | O'Brien et al. | 62/11 |
| 5,231,772 | 8/1993 | Hermanns et al. | 62/11 |
| 5,344,627 | 9/1994 | Fujii et al. | 62/11 |
| 5,450,728 | 9/1995 | Vora et al. | 62/11 |

*Primary Examiner*—Ronald C. Capossela
*Attorney, Agent, or Firm*—Pravel, Hewitt, Kimball & Krieger

[57] ABSTRACT

A process and apparatus for recovering and reusing volatile organic compounds and pad gases when such mixtures of gases are discharged from marine vessels during loading. Pad gases containing volatile organic compounds are removed from marine vessel storage tanks, compressed using a reciprocating compressor, cooled in multiple stages to condense out the volatile organic compounds, then stored in pressure tanks. The pad gases stored in these pressure tanks are then reused as needed to pad the marine vessel cargo.

21 Claims, 1 Drawing Sheet

PRESSURE TANK RECYCLE SYSTEM

BACKGROUND OF THE INVENTION

1. Field of the Invention

This invention relates to the recovery and reuse of volatile organic compounds and inert pad gases. More specifically, the invention provides an apparatus and process for recovering and reusing volatile organic compounds and inert pad gases when such mixtures of gases are discharged from marine vessels during loading.

2. Description of the Related Art

The release of volatile organic compounds (VOCs), especially hydrocarbons, into the atmosphere during loading of marine vessel storage tanks long plagued the petroleum industry. Air or inert gases such as carbon dioxide or nitrogen were generally added to marine vessels and tanks upon unloading to fill the space created by pumping out liquid cargo. These gases are referred to as pad gases. Later, as liquid cargo was loaded, the pad gases were displaced by the liquid and had to be vented. The pad gases and any contained VOCs were then lost.

Several different methods were employed to control the emission of VOCs to the atmosphere. Applicant is named as co-inventor of a U.S. Patent in this area, U.S. Pat. No. 5,050,603 entitled, "Mobile Vapor Recovery and Vapor Scavenging Unit."

The methods employed to control these VOC emissions could be divided into three categories: (1) closed loading of tank vessels, more properly termed vapor balancing; (2) incineration; and (3) recovery processes.

Closed loading of tank vessels necessitated loading with all the hatches and ports closed. This was contrary to most barge practice but was routine on most large tank ships. The term "closed loading" did not necessarily imply the capture of vapors, rather, as a tank was being filled, the vapor in the free space above the level of the liquid being loaded was displaced upward into a pipeline that returned the vapor to the free space of the tank being emptied. Thus, the vapor was in effect recycled from the tank being filled to the tank being emptied.

Combustion or incineration processes could be more than 98% efficient if operated properly. They could perform reliably as the sole hydrocarbon control process but were more reliable as polishing units. Polishing units were secondary VOC removal systems that removed lower concentrations of VOC's after another, primary removal system had removed the majority of the VOC's. The primary drawbacks with these processes were that they did not recover the hydrocarbon product and they were a source of air pollution. The value of this incinerated hydrocarbon could be significant when crude or gasoline was being shipped. Furthermore, combustion devices could be relatively unsafe because they were potential sources of fire and explosion caused by the flammable VOCs and hydrocarbon products. The incineration process also produced $NO_x$ that contributed to smog. Thus, incineration was to an extent a self-defeating method since it contributed to the very ill that was being sought to be eliminated.

Vapor recovery processes could be divided into three types: (1) lean oil absorption; (2) refrigeration at atmospheric or higher pressures reached by compressing the pad gases; and (3) carbon bed absorption. Lean oil absorbers operated at pressures of 100 to 200 psia were very efficient at recovering hydrocarbons from rich streams but were less efficient at removing hydrocarbons from streams that contain little hydrocarbon. Typically, an absorber could remove up to about 95% of the ethane and heavier fraction of the vaporous hydrocarbon content of a feed stream by pressure increase and temperature decrease. At temperatures below 60° F., hydrate formation caused freeze-up problems. If the system was under pressure, water could also freeze at temperatures above 32° F. Antifreeze could be used to lower the liquid hydrocarbon freezing point but this added to operating costs. The absorption process could only reduce a vapor stream's hydrocarbon content to 1–3% (volume) of the initial ethane and heavier fraction economically. Thus, the absorber off gas had to be routed to a polishing flare or incinerator.

The direct refrigeration system removed hydrocarbons by cooling and condensing the vapors through a series of low temperature heat exchangers. This process had the advantage that very low temperatures were possible so that up to 99% of a stream's hydrocarbon content could be removed. However, in order to achieve this high proportion of hydrocarbon reduction, temperatures below 60° F. were required and at these temperatures hydrates formed and plugged the exchanger surfaces and lines. This could be avoided by the injection of ethylene glycol or other antifreezes. Direct refrigeration units that employed vapor compression and expansion with regenerative heat exchange against very cold expander discharge refrigerants, were sometimes used. However, even the best of these could not remove ethane and heavier hydrocarbons to the very low levels required by regulatory authorities, i.e., two pounds of hydrocarbon vapor emitted per 1000 barrels loaded.

An apparent solution was to incinerate this stream in a flare, however, the use of such flares was a safety hazard and were unacceptable to the Coast Guard authorities for use on board a ship. Moreover, flares produced $NO_x$ and were to that extent counterproductive since $NO_x$ contributed to smog. Further, the direct refrigeration unit exit stream was so lean that hydrocarbons would have to be added to enrich it to enable combustion. This was a waste of product that was costly to recover in the direct refrigeration process.

Carbon bed absorbers used activated carbon or a similar absorptive material to absorb hydrocarbons selectively. After the absorptive capacity of the carbon was used up, the hydrocarbon would "break through" and appear in increasing amounts in the exiting vapor stream. Generally, the spent carbon would be disposed of. However, if the volume of spent carbon was large enough, a regeneration system to recover the carbon could be cost effective. The best approach was to use a vacuum to desorb the hydrocarbon from the carbon. As an alternative, the hydrocarbon could be steam stripped from the carbon but this generated an oily waste water stream that had to be disposed of. Carbon beds did not do an efficient job of recovering light ends such as ethane and propane. For use in marine applications, carbon beds needed to be very large to handle the high flow rates and hydrocarbon loadings generated.

These methods that were employed to control the emission of VOCs did not allow complete recovery of the VOCs for reuse and recovery of the inert gases for reuse and thus did not provide a totally satisfactory solution to the problem.

SUMMARY OF THE PRESENT INVENTION

The present invention provides for the recovery and reuse of pad gases and volatile organic compounds emitted from marine vessels during the loading process. In the present invention, pad gases containing volatile organic compounds are removed from marine vessel storage tanks, compressed using a reciprocating compressor, cooled in multiple stages to condense out the VOCs, then stored in pressure tanks. The pad gases stored in these pressure tanks can then be reused as needed to pad the marine vessel cargo.

The present invention can be contained entirely on a marine vessel. This allows recovery of the VOCs and pad gases at smaller terminals and offshore oil rigs where construction of vapor recovery units strictly to load marine vessels would be prohibitively expensive.

The present invention uses a fan blower in combination with a pressure control valve to remove pad gases from the marine vessel storage tanks while maintaining a positive pressure on those tanks. The fan blower then supplies these VOC containing pad gases to the suction of a reciprocating compressor. The pad gases are then compressed to allow condensation of the VOCs at higher temperatures. Condensers are used between each stage of compression to condense and collect the condensibles from the inert gas streams. A final stage of cooling, employing refrigeration, cools the pad gases to prevent any further liquid condensation after the pad gases are loaded into the pressure tanks for storage. An important aspect of the present invention is that the compression of the pad gases allows condensation of contained VOCs at higher temperatures and also enables those gases to be stored for later use.

The stored pad gases are reused when the marine vessel is unloaded. As liquid cargo is pumped out of the vessel, it is necessary to fill the space created with pad gas. The pad gases stored in the pressure tanks are expanded through a multi-stage pressure reducing system to fill this space.

The present invention accordingly meets a need that has, as far as is known, been unmet for totally preventing the discharge of any VOCs, recovering the VOCs for reuse, and recovering the inert pad gases.

BRIEF DESCRIPTION OF THE DRAWINGS

A better understanding of the invention can be obtained when the detailed description set forth below is reviewed in conjunction with the accompanying drawings, in which.

DETAILED DESCRIPTION OF THE PREFERRED EMBODIMENT

Figure 1:
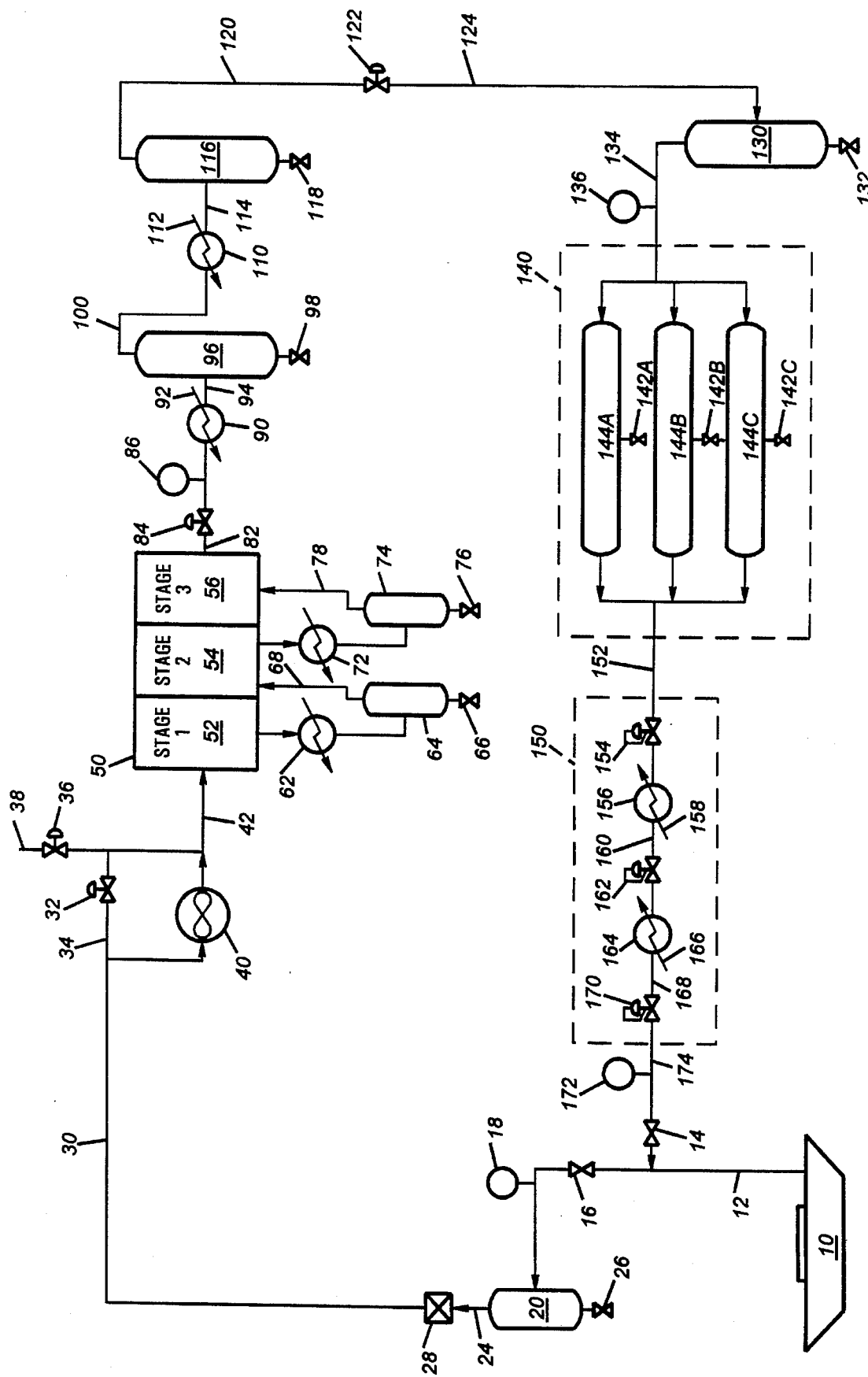
FIG. 1 is a flow diagram showing the process flow in a preferred embodiment of the invention.

As shown in FIG. 1, the process for recovering pad gases and contained VOCs begins by removing these gases from the marine vessel storage tanks 10. As the unloading process begins, venting valve 16 opens and the padding valve 14 is closed. The pad gases are pulled through a knockout pot 20 that removes any contained droplets of liquid or rust particles, by a blower fan 40. The blower fan 40 is used in conjunction with a pressure control valve 32 to supply pad gases to the compressor 50 while simultaneously maintaining a positive pressure on the marine vessel storage tank 10.

It is important that the blower fan 40, the pressure control valve 32, and the pressure transmitter 18 prevent creation of a vacuum on the marine vessel storage tanks 10. Otherwise, such a vacuum could cause air to seep into the storage tanks 10 and also potentially damage the structure of the marine vessel storage tanks 10.

The blower fan 40 pulls a constant amount of pad gas and delivers the gas to the discharge line 42. The pressure transmitter 18 monitors the pressure on the marine vessel storage tanks 10 and causes the pressure control valve 32 to open if the blower fan 40 is removing pad gas at a rate that causes the pressure to fall below one to two psig. This system can be controlled by conventional controllers or by a computer control system.

The knockout pot 20 may be equipped with a flame arrester 28 for safety reasons. An alternative to the knockout pot 20 could be a scrubber system that would remove any acid gases such as $H_2S$ contained in the pad gas.

The pad gases pulled through the blower fan 40 are delivered into the compressor 50 through the blower exit line 42. In the preferred embodiment, the compressor 50 is a multi-stage reciprocating compressor having a first stage 52, a second stage 54, and a third stage 56. The three stage compressor 50 operates at a compression ratio of three to one per stage, 27 to one overall.

An efficient water or air cooled condenser 62 is connected between the compressor stages 52 and 54, while a similar condenser 72 is located between stages 54 and 56. A separator 64 is located after condenser 62 and a separator 74 located after condenser 72 to collect a mixture of condensed VOCs and water. The liquids so collected can be returned to the marine vessel storage tanks 10 by connecting a line from it to either or both of a set of separator liquid drain valves 66 and 76. In the preferred embodiment, the pad gases are compressed in compressor 50 to between about 325 psig and 425 psig. However, the pad gases may be compressed up to about 1500 pounds in situations where space limitations require smaller equipment.

There is some shrinkage in the volume of pad gas due to removal of VOC's and water with the present invention. It is important that additional pad gases be injected into the suction of the compressor 50 to make up for this shrinkage. This ensures that there is enough pad gas stored to refill the marine vessel storage tanks 10 when the liquid cargo is unloaded. Alternatively, when the marine vessel 10 is docked and fully unloaded, additional pad gas can be added to the pressure tank storage system 140 in sufficient quantity to replace the shrinkage in volume.

The compressed pad gases then flow through a series of condensers 90 and 110. The first condenser 90 is an air or water cooled condenser and is accompanied by a separator 96 that collects condensed VOCs. The final condenser 110 employs direct refrigeration at about 25° to 30° F. to cool the pad gases to about 32° F. This is done to reduce the chance of liquids condensing out in the pressure tank storage system 140 which stores the pad gases. When the invention is used in cold climates, the pad gas temperature coming out of the final condenser 110 can be adjusted down to as low as 0° F. or lower using methanol injected in the condenser 110 to prevent freezing or formation of hydrocarbon hydrates.

The pad gases leave a final separator 116 after condenser 110 and flow through a pressure let-down system 122. The pad gases then flow through a separator 130 to collect any liquid VOCs, through a heater 134, and on into the pressure tank storage system 140.

The pressure let-down system 122 is an important feature to the operation of this process. In the preferred embodiment, the pressure let-down system includes three pressure control valves 124, 126, and 128 that decrease the pad gas pressure in three stages. Pressure let-down system 122 operates to maintain a constant pressure at the compressor 50 discharge. A pressure transmitter 86 monitors the pressure on a discharge line 82 from compressor 50, and can be used to control the pressure let-down system 122.

Operation of this system 122 is important because the pressure downstream of this let-down system 122 changes during the course of loading marine vessel storage tanks 10. Initial pressure in the pressure tank storage system 140 is low and there is a large pressure drop across the pressure let-down system 122. As the pressure tank storage system 140 is filled, the pressure in the system 140 rises and the pressure drop across the pressure let-down system 122 decreases.

While the pressure changes in the pressure tank storage system 140, the pressure let-down system 122 must maintain a constant pressure on the pad gas at the discharge of the compressor 50. The pressure must be held constant to maintain the proper compression ratios on the compressor 50 and also to allow adequate condensation in the condensers 90 and 110.

The pressure drop across the pressure let-down system 122 usually results in a decrease in the pad gas temperature. The heater 134 heats the pad gases to within about 20° F. of ambient temperature before loading into the pressure tank storage system 140. It is important that the pad gases be heated before loading the pressure tank storage system 140 to prevent the system 140 from overpressuring as the stored pad gases warm to ambient temperature.

The pressure tank storage system 140 includes several elongated cylindrical steel tanks 144A, B, and C. These tanks 144 can be positioned horizontally such that their axis points to the fore and the aft of the marine vessel 10. While three tanks are depicted here, the actual number of tanks 144 can vary with the application. The size of the tanks also varies with the pressure to which the pad gases are compressed.

As a safeguard, each of the cylindrical steel tanks 144 are provided with a drain 142. The drains can be connected by a pipe leading to the marine vessel storage tanks 10 and should be tested periodically to be sure there is no liquid buildup in the tanks 144. Alternatively, a device that indicates the presence of condensed liquids can be added to the bottom of each cylinder. It is important that no water accumulate within these tanks 144 because the water in the presence of carbon dioxide is very corrosive. The tanks 144 may also be equipped with a safety relief valve which vents to the marine vessel storage tanks 10 or to the suction of the compressor 50.

Once the marine vessel storage tanks 10 have been fully loaded with liquid cargo, the process including the compressor 50 and the blower fan 40 can be shut down. The compressed pad gases remain in storage in the pressure tank storage system 140 until needed.

When the marine vessel storage tanks 10 are unloaded by pumping out liquid cargo, it is necessary to fill the space created by the exiting liquid cargo with pad gas. This is done by expanding the pad gases from the pressure tank storage system 140 back into the cargo space in the marine vessel storage tanks 10 through a multi-stage pressure reducing system 150.

The multi-stage pressure reducing system 150 in the preferred embodiment is composed of a series of three pressure regulators 154, 162, and 170. The system 150 is supplied with heat by heaters 156, 164, and 176 in order to prevent freeze ups in the pressure regulators 154, 162, and 170 and also to resupply the pad gases at ambient temperature to the marine vessel storage tanks 10. The latter is done so that the pad gases do not increase in pressure due to warming from sub-ambient temperatures. Waste heat from the cargo engine pumps can be used as the source of this heat.

The process of the present invention is particularly suited to use on vessels using inert gases because of the savings in inert gas generation. It is also particularly suited to handling of hazardous and valuable materials like acrylonitrile, butadiene, benzene, and vinyl chloride.

If air is handled rather than inert gas, then it is very important that no air-VOC mixture be stored that is close to the explosive range, which range is lowered by the effect of increased pressure. Therefore, an important part of the process is a control 139 that monitors the pad gas and shuts down the system in the event the concentration of volatile organic compounds in the air exceeds about 60% of the lower explosive limit. If inert gas is handled, this explosion hazard is prevented as long as the oxygen content of the inert gases is maintained below certain known limits. Therefore, the control 139 shuts down the system when the oxygen content of the inert pad gases exceeds about 4%.

The process is also particularly suited to use for petroleum liquids that are padded with the inert gas of carbon dioxide. This is because compressing the gas allows both condensation at higher temperatures and also avoids freezing problems would be caused by the carbon dioxide at lower temperatures and lower pressure.

It should be understood that there can be improvements and modifications made to the embodiments of the invention described in detail above without departing from the spirit or scope of the invention, as set forth in the accompanying claims.

What is claimed is:

1. A method for recovering volatile organic vapors and pad gases discharged from marine vessels during loading, comprising:

(a) controlling the flow of pad gases containing volatile organic vapors being discharged from the vessel while simultaneously controlling the vessel pressure;

(b) compressing the pad gases;

(c) cooling pad gases to condense out volatile organics;

(d) refrigerating the pad gases to condense out additional remaining volatile organics;

(e) maintaining a constant pressure on the pad gases after compressing through the refrigerating;

(f) heating the pad gases; and (g) directing the pad gases into pressure tanks for future use.

2. The method of claim 1, wherein the pad gases are compressed to about 300 psig or greater.

3. The method of claim 1, wherein the pad gases are compressed to between about 300 psig and about 1500 psig.

4. The method of claim 1 wherein the pad gases are compressed to between about 325 and about 425 psig.

5. The method of claim 1, wherein the pad gas is nitrogen.

6. The method of claim 1, wherein the pad gas is carbon dioxide.

7. The method of claim 1, wherein the pad gas is air.

8. The method of claim 1, wherein the pad gas is inert gas made by combustion.

9. The method of claim 1, wherein the pad gas is refrigerated to cool the pad gas to a temperature between about zero and about 32° F.

10. The method of claim 1, wherein the pad gas is refrigerated to cool the pad gas to a temperature between about −50° F. to about 32° F.

11. The method of claim 1 further comprising removing the pad gases from the pressure tanks, expanding the pad gases through a pressure reducing system, heating the pad gases, and directing pad gases into the vessel.

12. The method of claim 10 further comprising adding additional pad gas prior to compressing to make up for shrinkage.

13. The method of claim 10 wherein the pad gases are heated with waste heat from cargo engine pumps.

14. A method for recovering and reusing volatile organic vapors and pad gases discharged from marine vessels during loading, comprising:
   (a) controlling the flow of pad gases containing volatile organic compounds being discharged from the vessel while simultaneously controlling the vessel pressure;
   (b) compressing the pad gases to a pressure between about 300 and about 1500 psig;
   (c) cooling the pad gases to condense out volatile organic compounds;
   (d) refrigerating the pad gases to a temperature of between zero and 32° F. to condense out additional volatile organic compounds;
   (e) maintaining a constant pressure on the pad gases after compressing through the refrigerating;
   (f) heating the pad gases to within 20° F. of ambient temperature;
   (g) directing pad gases into a pressure tanks for future reuse as pad gas for the marine vessel;
   (g) removing the pad gas from the pressure tanks;
   (h) expanding the pad gas through a pressure reducing system; and
   (i) heating the pad gases and directing the pad gases into the marine vessel.

15. An apparatus for recovering and reusing volatile organic compounds and pad gases discharged from marine vessels during loading, comprising:
   (a) a pressure controlling system for maintaining a positive pressure on the marine vessel while removing the pad gases;
   (b) a compressor for increasing the pressure of the removed pad gases;
   (c) a condenser and separator to cool the pad gases and condense and separate out volatile organic compounds;
   (d) a refrigeration condenser and separator to further cool the pad gases and condense and separate out additional volatile organic compounds;
   (e) a pressure let-down system for maintaining a constant pressure on the pad gases from the compressor discharge through the refrigeration condenser;
   (f) a heater for heating the pad gases prior to storage;
   (g) tanks for storing the pad gases from which the volatile organic compounds have been removed for future reuse as pad gases on the marine vessel; and
   (h) a pressure reducing system for expanding the pad gas removed from the tanks and reducing the pressure on the pad gases;
   (i) a heater for heating the pad gases prior to heat the pad gases prior to reusing in the marine vessel.

16. The apparatus of claim 14 wherein the compressor is a three-stage reciprocating compressor.

17. The apparatus of claim 14 further comprising a condensing exchanger and liquid knockout vessel between each stage of the compressor for condensing and removing condensed volatiles.

18. The apparatus of claim 14 wherein the pressure reducing system consists of three pressure reducing valves in series.

19. The apparatus of claim 14 further comprising a blower fan to induce a constant flow of pad gases from the marine vessel and to supply to the compressor.

20. The apparatus of claim 14 further comprising a knockout vessel downstream of the pressure control valve to collect any liquids which condense as the pad gases are expanded across the valve.

21. The apparatus of claim 14 further comprising a scrubber system for removing acid gases.

* * * * *